United States Patent Office 2,721,555
Patented Oct. 25, 1955

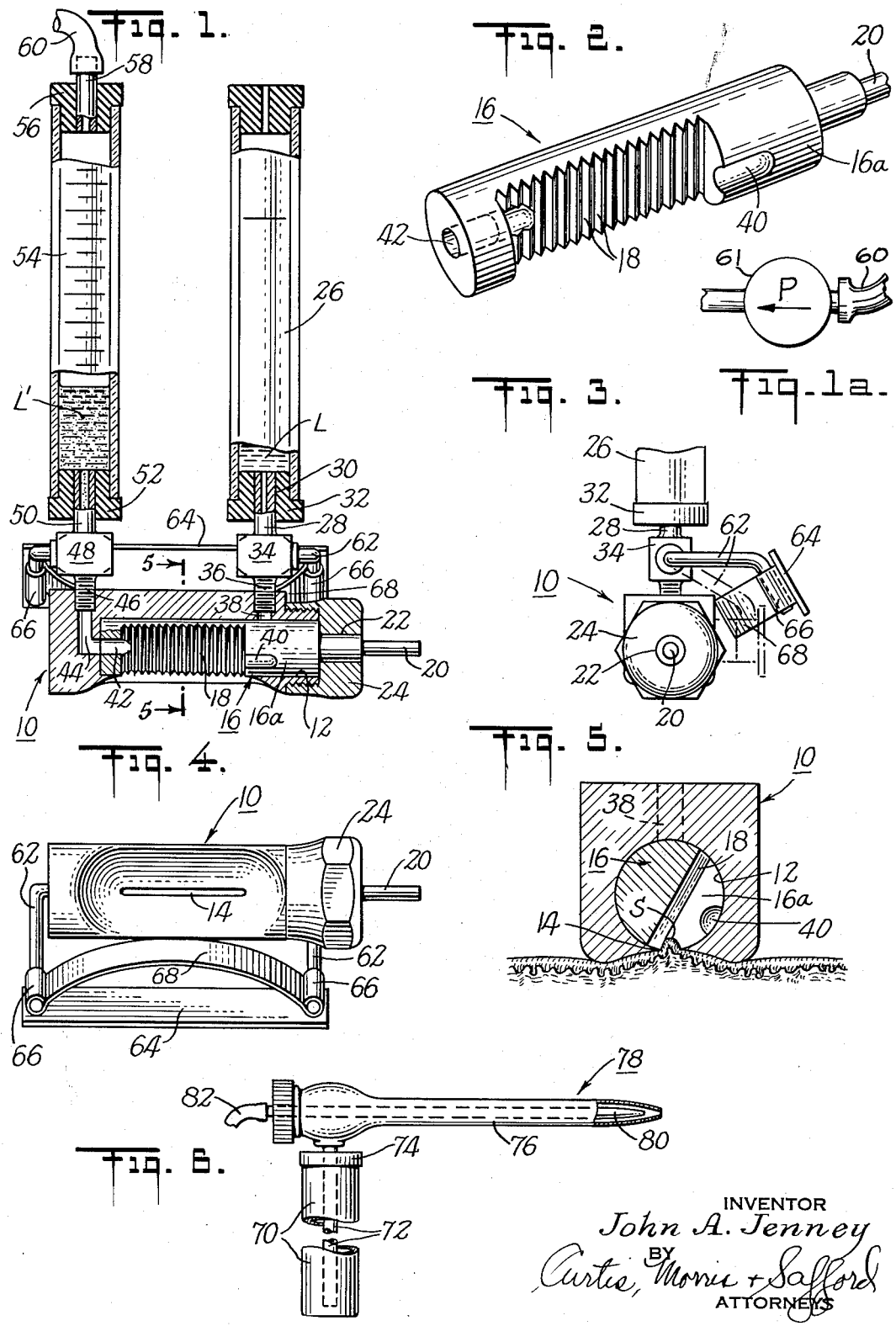
Oct. 25, 1955 — J. A. JENNEY — 2,721,555
DERMATOME
Filed Dec. 3, 1952
INVENTOR
John A. Jenney
BY
Curtis, Morris + Safford
ATTORNEYS

2,721,555

DERMATOME

John A. Jenney, New York, N. Y.

Application December 3, 1952, Serial No. 323,759

8 Claims. (Cl. 128—305)

The present invention relates to a method of skin grafting and to a specialized instrument for excising graft material.

In the conventional method of skin grafting, a continuous sheet of epidermis is removed from the donor skin area and is superposed upon the recipient area, in a unitary piece, or as a series of spaced strips. In the latter case, the recipient area is somewhat larger than the donor area, with the grafted strips growing laterally to cover the entire recipient area and form an integral epithelial sheath.

It is among the objects of the present invention to provide a method of skin grafting which affords substantial economy of donor skin by permitting implantation of the graft material at a lesser concentration than in any previous method. Another object of the present invention is to provide a method of skin grafting which facilitates handling of the graft material and its implantation in relatively inaccessible or awkward areas of the body. It is also an object to provide a dermatome which will rapidly, efficiently and safely excise epidermal material from the donor area to any desired depth, regardless of the thickness of the skin in this area, and preserve the skin material thus removed in a form for convenient application to the recipient area. A further object is the provision of a dermatome of such size and shape that it may be easily handled and used, and which is so constructed that it may readily be rendered aseptic. Other objects and advantages of the present invention will be in part apparent and in part pointed out hereinafter.

The present invention accomplishes these objects by providing a dermatome which includes a cutting head with a cutting chamber therein and with a slot in the outer wall of the cutting head communicating with the cutting chamber to permit skin to be pressed through the slot into the cutting chamber or sucked into it by reducing the pressure therein, and a movable cutter to cut or abrade the skin which projects into the cutting chamber and to reduce the same to a myriad of minute skin particles. A stream of wholesome liquid medium, such as a saline solution or blood plasma, is provided through the cutting chamber to entrain the skin particles and to transport them into a receiving tube which communicates with the cutting chamber. The outer end of the receiving tube is connected to a vacuum pump to induce this flow of the liquid and the entrained skin particles, and to apply a reduced pressure on the cutting chamber to cause the skin to be sucked up into it to be operated upon by the moving cutter. The liquid and its suspended skin particles are sprayed against the properly prepared "bed" of the recipient body area to deposit the skin particles thereon as "seeds" which form the nuclei for skin growth.

In the drawings:

Figure 1 is an elevational view, partly in section, of a dermatome embodying features of the present invention;

Figure 1a is an elevational view at reduced scale of a vacuum pump adapted to be connected to the dermatome shown in Figure 1;

Figure 2 is an enlarged perspective view of the rotatable cutter of the dermatome;

Figure 3 is a fragmentary end view of the dermatome;

Figure 4 is a bottom end view of the dermatome;

Figure 5 is an enlarged vertical sectional view taken generally along the line 5—5 of Figure 1, and showing, somewhat diagrammatically, the position of the skin with respect to the cutting head; and, Figure 6 is an elevational view, partly in section, of an apparatus for spraying the skin material against the recipient area.

The dermatome which is shown in the accompanying drawings and which embodies features of the present invention includes an elongated cutting head 10 containing a cylindrical bore or cutting chamber 12 extending longitudinally thereof, with a narrow slot 14 (Figures 4 and 5) extending longitudinally of the outer end of the cutting head 10 and communicating with the cylindrical cutting chamber 12. Snugly and rotatably received within the cutting chamber 12 is a cylindrical cutter 16 which is best shown in the perspective view of Figure 2. This cylindrical cutter 16 is cut away in its central portion to form a row of serrations or teeth 18 which extend generally diametrically across the cutter 16. At one end of the cutter 16 a drive shaft 20 projects axially from the cutter through an opening 22 in an end cap 24 which is threadably secured on the end of the cutting head 10. The shaft 20 is adapted to be connected to suitable driving means, for example, a flexible drive shaft which extends from an electric motor, for rotation of the cutter 16 within the cutting head 10, without unduly restricting the portability of the instrument or its adaptability for use in relatively inaccessible body areas.

At one end of the cutting head 10, the right-hand end as viewed in Figure 1, a supply vessel or tube 26 is supported by means of a short tube 28 which is frictionally received in an opening 30 in a rubber stopper 32 which closes and supports the lower end of the supply tube 26. The lower end of the tube 28 is connected into the top of a valve 34. The valve 34 is supported on and connected into the upper face of the cutting head 10 by means of a nipple 36. An inlet port 38 in the cutting head 10 communicates with the nipple 36 and extends downwardly to open into the cutting chamber 12 at a point opposite the end portion 16a of the cutter 16. As may be seen in Figures 1 and 2, the end portion 16a is generally cylindrical and is adapted to fit snugly the adjacent walls of the cutting chamber 12, except for an inlet channel 40 which extends longitudinally of the cutter 16 from a point opposite the inlet port 38 to one end of the cut-away central portion of the cutter.

The end portion 16a of the cutter 16 effectively seals the inlet port 38 except during that portion of each revolution of the cutter 16 when the inlet channel 40 is in registration with the inlet port 38. At this point in the rotation of cutter 16, assuming the valve 34 is open, there is a clear passage for liquid from the supply tube 26 into the cutting chamber 12. During operation of the dermatome, a pulse of liquid L is thus supplied from the supply tube 26 to the cutting chamber once each revolution of the cutter 16. This liquid, which, for example, may be a normal saline solution, provides a wholesome medium for supporting and transporting the skin particles which are removed by the dermatome.

At the opposite end of the cutter 12—the left-hand end as viewed in Figure 1—the cutter is provided with an axial bore 42 which extends from the end of the cutter to open into the left-hand end of the cut-away central portion of the cutter. Opposite the bore 42 in the end portion of the cutting head 10 there is provided an outlet port 44 which extends upwardly to the upper face of the cutting head 10 in communication with a nipple 46 which is threaded into the cutting head 10. The nipple 46 supports and opens into a valve 48 from the upper or outlet side of which there extends a short tube 50. The tube 50 extends through a rubber stopper 52 which closes and supports the lower end of a receiving tube 54. The upper end of the receiving tube 54 is closed by a stopper 56 through which extends a tube 58 which is adapted for connection to a length of flexible tubing 60 which extends from a vacuum pump 61, shown in Figure 1a. The vacuum pump 61 thus develops a reduced pressure in the receiving tube 54 and, when valve 48 is opened, in the cutting chamber 12.

When the outer end of the cutting head 10 is brought into contact with the surface of the skin to be operated upon, the reduced pressure in the cutting chamber 12 causes the skin to be "sucked up" into the cutting chamber as is indicated, somewhat diagrammatically, in Figure 5. The rotation of the cutter 16 brings its serrated cutting teeth 18 into engagement with the portion of the skin S which projects through the slot 14 into the cutting chamber 12 to cut away this portion of skin. Due to the fact that the cutter is rotated at a high speed as compared to the rate at which the surgeon normally moves the dermatome across the skin surface, the amount of new skin which is brought into the cutting chamber to be operated upon by the cutting teeth at each revolution of the cutter is very small so that the cutter, in effect, is "nibbling" at very small successive increments of the skin. Because of this, and because of the finely serrated construction of the cutting teeth 18, the skin which is removed by the dermatome is divided into a myriad of minute particles. Although many of these particles may be large enough to be readily visible, many others will be of microscopic size, and some will be so small as to comprise only a few tissue cells. These skin particles are entrained in the liquid L which is flowing through the cutting chamber 12, as previously described, to form a suspension L' which is conveyed into the receiving tube 54. This flow of the liquid and of the entrained skin particles is induced by the reduced pressure in the receiving tube 54.

The construction of the dermatome is such that the flow of the liquid, although intermittent and pulsating, is substantially unidirectional from the suply tube 26 longitudinally through the cutting chamber 12 and into the receiving tube 54. This assures that the skin particles will flow progressively from the cutting chamber 12 into the receiving tube 54 in a minimum of time to prevent accumulation of skin particles in the cutting chamber. The sharp bursts of fluid which are directed through the inlet channel 40 against the cutting teeth 18 tend to purge the teeth of skin particles and prevent the teeth from becoming fouled.

The inlet valve 34 and outlet valve 48 are controlled by means of angular lever arms 62 which extend first laterally from the cutting head 10 and are then bent downwardly along one side of the cutting head. The lower ends of the two lever arms 62 are interconnected by means of a cross bar 64 which is secured to the lever arms by means of loops 66 formed in the end portions of a leaf spring 68 which is secured to the cross bar 64 adjacent the lever arms 62, as by spot welding. The central portion of the leaf spring 68 bellies outwardly to engage the adjacent face of the cutting head 10. The leaf spring 68 serves normally to maintain the cross bar 64 and lever arms 62 in the position shown in full lines in Figure 3, at which position the inlet and outlet valves 34 and 48 are closed. Pressing the cross bar 64 inwardly toward the cutting head 10 against the resistance of the leaf spring 68 to the position shown in broken lines in Figure 3, rotates the lever arms 62 to such position as to open the inlet and outlet valves 34 and 48 and permit the flow of liquid L through the cutting chamber 12 as previously described.

The arrangement of the cross bar 64 relative to the cutting head 10 is such that the dermatome may easily be held in one hand, with the fingers gripping the outside of the cross bar 64 and the remote face of the cutting head 10. If it is desired to open the valves 34 and 48, the surgeon merely squeezes the cross bar 64 toward the cutting head 10 as shown in broken lines in Figure 3; to close the valves 34 and 48 he merely releases this pressure and allows the leaf spring 68 to return the cross bar to the position shown in full lines.

At the start of the skin cutting operation, the supply tube 26 is filled with liquid L, which may be a normal saline solution, or some other wholesome medium for the skin particles, while the receiving tube 54 is empty or substantially so. The surgeon brings the outer end of the cutter lightly into contact with the surface of the skin in the donor area, presses the cross bar 64 to open the inlet and outlet valves 34 and 48 to create a partial vacuum in the receiving tube 54 and cutting chamber 12. This will cause skin to be sucked up against the outer face of the cutting head and, if the cutter 16 is momentarily in such position as not to block the slot 14, the skin will protrude slightly into the cutting chamber 12. The surgeon then starts the electric motor which drives the cutter 16. As the cutter 16 rotates, particles of skin will be cut away from the donor area, and entrained in saline solution which will begin to flow from the supply tube 26. In normal use of the dermatome, the surgeon will stroke it lightly across the surface of the donor skin area, keeping the instrument in motion as long as it is in contact with the skin, because if the instrument remains stationary at any one spot, it will continue to cut deeper and deeper in the skin. However, the dermatome may be repeatedly stroked over the same skin area, cutting the skin to slightly greater depth on each stroke, with the surgeon continuing this process until the desired depth of cutting, as judged by the visual appearance of the donor area, has been attained.

The width of the slot 14, of course, governs the extent to which the skin projects up into the cutting chamber 12: the wider the slot, the greater the depth to which the skin can project into the cutting chamber. Normally, in skin grafting, only the epidermal layers of the skin are removed from the donor area, leaving the dermal or vascular stratum of the skin intact insofar as possible. However, since there is not a flat cleavage plane between the dermis and the epidermis, but the interface of these two strata is highly uneven or papillary, it is not possible to leave the dermis entirely intact without leaving also a substantial amount of epidermal material between and around the dermal papillaries. The wounding of the donor area is nevertheless properly regarded as a merely superficial abrasion or "scuff."

On each individual, the thickness of the skin varies considerably from one part of the body to another, for example, being extremely thick on the upper back and extremely thin on the eyelids. The extent to which it is normally desired to draw the skin into the cutting chamber varies with the thickness of the skin; if the skin is thick, it is normally desirable to draw it farther into the cutting chamber because there is more epidermal material to be removed. However, thicker skin is more inflexible than thin skin and more strongly resists being drawn through the slot 14. In order to accommodate skin of the particular thickness encountered in the donor area, it is accordingly desirable to be able to vary the width of the slot 14 in the cutting head. For simplicity of construction and ease of sterilization, it is believed most advantageous to make the cutting head as a single piece and merely substitute one cutting head for another in order to change the width of the slot.

For sterilization of the dermatome, it is normally dismantled completely. The construction of the dermatome shown and described herein is such that it may readily be dismantled and reassembled. The supply and receiving tubes 26 and 54 may be removed by removing the stoppers 32, 52 and 56 and removing the tubes 28, 50 and 58 from the stoppers. The valves 34 and 48 may be removed from the cutting head 10 by slipping the crossbar 64 off of the ends of the valve-operating levers 62 and by unscrewing the nipples 36 and 46 from the cutting head. The cutting head itself may be dismantled by unscrewing the end cap 24 to open the end of the cutting head and sliding the cutter 16 endwise out of the cutting chamber 12. When the dermatome is reassembled after sterilization, the surgeon or his assistant may merely select any of a number of cutting heads having slots 14 of different widths, according to the requirements of the particular operation to be performed.

Before the skin particles are implanted upon the recipient area, it is prepared according to well-known surgical methods. Any granulation tissue should be removed to provide a smooth floor of free bleeding capillaries. This bleeding, since it is merely capillary, is soon stanched to provide a smooth clot which will bind the skin particles deposited upon it.

The skin particles may be applied to the recipient area merely by spraying upon it the liquid L' containing the entrained skin particles. Suitable apparatus for spraying the suspension L' is shown in Figure 6. This apparatus includes a supply tube 70 containing the liquid L', into the bottom portion of which tube an exhaust tube 72 extends. The exhaust tube 72 extends through a stopper 74 which closes and supports the upper end of the supply tube 70. The upper end of the exhaust tube 72 communicates with one end of the outer jacket 76 of a conventional nozzle, generally indicated 78. The nozzle 78 coaxially contains an air tube 80, one end of which is connected through an air hose 82 with a source of pneumatic pressure and the other end of which stops just short of the outer tapered end of the outer jacket 76. As will be understood, when compressed air is forced through the central tube 80, the liquid L' and its entrained skin particles are drawn out of the supply tube 70 and projected in a fine mist from the end of the nozzle. By properly dimensioning the nozzle, the rate at which the liquid L' is furnished to the recipient body area may be controlled as desired.

The spraying apparatus described is easily handled and may be used in relatively inaccessible or awkward areas of the body. The surgeon may sweep the spray over the recipient body area to lay down as concentrated a coating of the skin material as is desired. The deposited skin particles adhere to the prepared surface of the recipient area and change its color to a degree depending upon the thickness of the deposited layer. This gives the surgeon a visual indication of the thickness of the layer and shows up any irregularities in the layer, so that he may effectively "paint" the skin material onto the recipient area to achieve exactly the result desired.

Alternatively, the liquid and the skin particles suspended therein could be applied to the recipient area by painting them on with a sterilized camel hair brush.

The deposited skin particles are, in effect, "seeds" planted in the fertile bed of the recipient area, and there, nourished in an everflowing bath of tissue fluid, they grow and multiply to form a continuous skin covering which is normal in all respects.

The individual skin particles may be deposited in any desired concentration to cover, if desired, a body area several times as large as the donor area. This is of particular importance in treating burn cases where large skin areas have been damaged.

The skin particles may safely be stored at room temperature for periods ranging up to several hours before they are implanted. Or, if it is desired to store the skin material for longer periods, it may be quick-frozen, for example by spraying the liquid into a container immersed in liquid nitrogen. In the frozen state, the skin material may be preserved indefinitely. The skin particles may be applied while still in frozen form by sprinkling them manually onto the recipient area.

The method and apparatus of the present invention thus afford a simple and highly practical means for effective skin grafting. It will accordingly be appreciated that the aforementioned as well as other desirable objects have been achieved. However, it should be emphasized that the particular embodiments of the invention which are shown and described are intended as merely illustrative and not as restrictive of the invention.

I claim:

1. A dermatome comprising a cutting head having a cutting chamber therein, a skin-receiving opening in said cutting head communicating with said cutting chamber, a cutter movable within said cutting chamber to excise portions of skin which project through said opening into said cutting chamber and to divide the same into minute particles, said cutter having a driving connection projecting through a wall of said cutting head for connection to a source of driving power, and a receiving vessel communicating with said cutting chamber for receipt of said skin particles therefrom.

2. A dermatome comprising a cutting head having a cutting chamber therein, a skin-receiving opening in said cutting head communicating with said cutting chamber, a cutter movable within said cutting chamber to excise portions of skin which project through said opening into said cutting chamber and to divide the same into minute particles, said cutter having a driving connection projecting through a wall of said cutting head for connection to a source of driving power, a receiving vessel communicating with said cutting chamber for receipt of said skin particles therefrom, and an outlet port communicating with said receiving vessel for connection to a source of vacuum to reduce the pressure in said receiving vessel and cause said skin particles to move from said cutting chamber into said receiving vessel.

3. A dermatome comprising a cutting head having a cutting chamber therein, a skin-receiving opening in said cutting head communicating with said cutting chamber, a cutter movable within said cutting chamber to excise portions of skin which project through said opening into said cutting chamber and to divide the same into minute particles, said cutter having a driving connection projecting through a wall of said cutting head for connection to a source of driving power, a supply vessel communicating with said cutting chamber for supplying a fluid medium thereto, a receiving vessel communicating with said cutting chamber for receiving said fluid medium and the skin particles entrained therein, and means for imposing a differential pressure on said fluid medium between said supply vessel and said receiving vessel to cause said fluid medium to flow from said supply vessel through said cutting chamber and into said receiving vessel.

4. A dermatome comprising a cutting head having an elongated cutting chamber therein, a skin-receiving opening extending longitudinally of said cutting head and communicating with said cutting chamber, a cutter movable within said cutting chamber to excise portions of skin which project through said opening into said cutting chamber and to divide the same into minute particles, said cutter having a driving connection projecting through a wall of said cutting head for connection to a source of driving power, a supply vessel communicating with an end portion of said cutting chamber for supplying a fluid medium thereto, a receiving vessel communicating with the other end portion of said cutting chamber for receiving said fluid medium and the skin particles entrained therein, and means for imposing a differential pressure on said fluid medium between said supply vessel and said receiving vessel to cause progressive flow of said fluid medium from said supply vessel through said receiving vessel from one end portion to the other and into said receiving vessel.

5. A dermatome comprising a cutting head having a cylindrical cutting chamber therein, a skin-receiving opening in said cutting head communicating with said cutting chamber, a cutter mounted within said cutting chamber for coaxial rotation, a drive shaft projecting axially from said cutter through an end wall of said cutting head for connection to a source of driving power to cause rotation of said cutter to excise portions of skin which project through said opening into said cutting chamber and divide the same into minute particles, and a receiving vessel communicating with said cutting chamber for receipt of skin particles therefrom.

6. A dermatome comprising a cutting head having an elongated, cylindrical cutting chamber therein, a skin-receiving opening extending longitudinally of said cutting head and communicating with said cutting chamber, a cylindrical cutter snugly and rotatably received within said cutting chamber, said cutter having at its periphery a longitudinally extending, finely serrated cutting edge adapted to come into shearing relation with an edge of said opening during each revolution of said cutter, to excise portions of skin which project through said opening into said cutting chamber, a drive shaft projecting axially from said cutter through an end wall of said cutting head for connection to a source of driving power to cause rotation of said cutter to excise portions of skin which project through said opening into said cutting chamber and divide the same into minute particles, and a receiving vessel communicating with said cutting chamber for receipt of skin particles therefrom.

7. A dermatome comprising a cutting head having a cylindrical cutting chamber therein, a skin-receiving opening extending longitudinally of said cutting head and communicating with said cutting chamber, a cylindrical cutter snugly and rotatably received within said cutting chamber, said cutter having at its periphery a longitudinally extending cutting edge positioned to come into shearing relation with an edge of said opening during each revolution of said cutter and at least one inlet channel extending longitudinally of said cutting head and communicating with said cutting chamber, a supply vessel communicating with an end portion of said cutting chamber through an inlet port so positioned that said inlet channel comes into registration with it during each revolution of said cutter to permit the intermittent passage of a fluid medium from said supply vessel into said cutting chamber to entrain skin particles therein, a receiving vessel communicating with the other end portion of said cutting chamber for receiving said fluid medium and the entrained skin cuttings and means for imposing a differential pressure on said fluid medium between said supply vessel and said receiving vessel to cause pulsating but generally unidirectional flow of said fluid medium from said supply vessel longitudinally through said cutting chamber and into said receiving vessel.

8. A dermatome comprising a cutting head having a cutting chamber therein, a skin-receiving opening in said cutting head communicating with said cutting chamber, a cutter movable within said cutting chamber to excise portions of skin which project through said opening into said cutting chamber and to divide the same into minute particles, said cutter having a driving connection projecting through a wall of said cutting head for connection to a source of driving power, a supply vessel communicating with said cutting chamber for supplying a fluid medium thereto, an inlet valve interposed between said supply vessel and said cutting chamber for controlling the flow of said fluid from said supply vessel into said cutting chamber, a receiving vessel communicating with said cutting chamber for receiving said fluid medium and the skin particles entrained therein, an outlet valve interposed between said cutting chamber and said receiving vessel for controlling the flow of said fluid and the entrained skin particles between said cutting chamber and said receiving vessel, means for imposing a differential pressure on said fluid medium between said supply vessel and said receiving vessel to cause said fluid medium to flow from said supply vessel through said cutting chamber and into said receiving vessel, depending upon the condition of said valves, and a single, movable control member operatively connected to operate both of said valves.

References Cited in the file of this patent

UNITED STATES PATENTS

| 1,064,053 | Coyle, Jr. | June 10, 1913 |
| 2,621,145 | Sano | Dec. 9, 1952 |

FOREIGN PATENTS

| 254,322 | Great Britain | June 24, 1926 |
| 645,713 | Great Britain | Nov. 8, 1950 |

OTHER REFERENCES

"Operative Surgery"; Bickham, W. S.; 1924; vol. I pg. 357. (This publication is available in Div. 55 of the Patent Office.)